(12) United States Patent
Sulc

(10) Patent No.: US 11,943,167 B2
(45) Date of Patent: Mar. 26, 2024

(54) DATA COLLECTION FROM ASYNCHRONOUS TRANSMISSIONS IN WIRELESS MESH NETWORKS

(71) Applicant: MICRORISC s.r.o., Jicin (CZ)

(72) Inventor: Vladimir Sulc, Brada-Rybnicek (CZ)

( * ) Notice: Subject to any disclaimer, the term of this patent is extended or adjusted under 35 U.S.C. 154(b) by 220 days.

(21) Appl. No.: 17/468,567

(22) Filed: Sep. 7, 2021

(65) Prior Publication Data

US 2022/0077992 A1  Mar. 10, 2022

(30) Foreign Application Priority Data

Sep. 7, 2020 (CZ) .............................. CZ2020-496

(51) Int. Cl.
*H04W 4/00* (2018.01)
*H04L 5/00* (2006.01)
*H04W 72/0446* (2023.01)
*H04W 4/38* (2018.01)

(52) U.S. Cl.
CPC .......... *H04L 5/0055* (2013.01); *H04L 5/0078* (2013.01); *H04W 72/0446* (2013.01); *H04W 4/38* (2018.02)

(58) Field of Classification Search
None
See application file for complete search history.

(56) References Cited

U.S. PATENT DOCUMENTS

| 8,681,656 | B2 | 3/2014 | Sulc |
| 9,615,308 | B2 | 4/2017 | Sulc |
| 10,972,388 | B2 * | 4/2021 | Yadav ................ H04L 45/38 |

OTHER PUBLICATIONS

Sulc et al., "IQMESH, Technology for Wireless Mesh Networks: Implementation Case Studies", ICNS 2012, Published on Mar. 25, 2012.*

* cited by examiner

*Primary Examiner* — Zewdu A Beyen
(74) *Attorney, Agent, or Firm* — Patent GC LLC; Alexander Franco

(57) ABSTRACT

A wireless mesh network includes a controller in wireless communication with a plurality of slave devices where each slave device is assigned a virtual routing number that defines a time slot in a TDMA communications frame. The slave devices are configured to receive, out of band and/or separately from the TDMA communications frame, asynchronous transmissions of sensor data from battery operated sensor devices. The battery operated sensor devices transmit asynchronously and do not participate in the TDMA communications frame in order to save battery power. The slave devices store data received from the sensor devices until the data is requested by the controller through an initiation message. In response, the slave devices aggregate data received directly from asynchronous communications with data received from other slave devices during an accumulation process that passes the accumulated date back to the controller through the mesh network during a TDMA acknowledgement frame.

15 Claims, 2 Drawing Sheets

FIG. 2
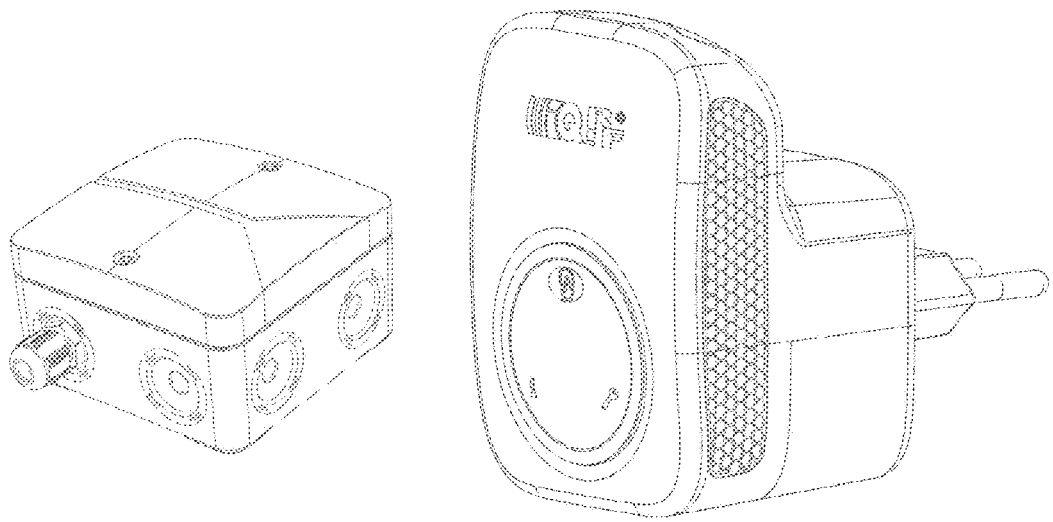
FIG. 3
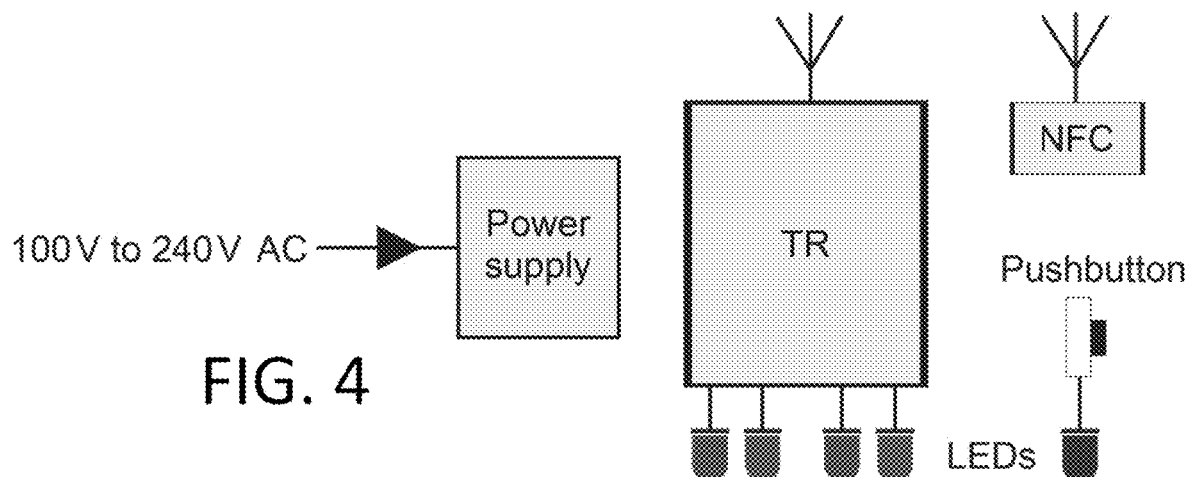
FIG. 4

__US 11,943,167 B2__

DATA COLLECTION FROM ASYNCHRONOUS TRANSMISSIONS IN WIRELESS MESH NETWORKS

RELATED PATENTS

The subject matter of this application is related to U.S. Pat. No. 8,681,656, filed on Nov. 23, 2011, U.S. Pat. No. 9,615,308, filed on Aug. 19, 2014, and Czech Republic Patent Application 2020-496, filed Sep. 7, 2020 all of which patents and applications are incorporated herein by reference in their entireties.

BACKGROUND OF THE INVENTION

The present disclosure relates to a methods for collecting data from sensor communication devices in wireless mesh networks arranged for conflict-free routing using time division multiplexing.

A mesh network is a network topology in which a connection can be established between devices connected in the network. A mesh network where a connection can be established between any two devices is called a fully connected mesh network. In practice, however, it is much more common to deal with cases where only some devices are connected to each other and can establish a connection.

In a wireless mesh network, devices communicate with each other wirelessly, usually in the radio frequency bands. Thus, the direct connection between two communicating devices is usually limited by the communication range of these devices. Devices out of communication range cannot establish a direct connection with each other. Therefore, messages are sent in blocks of data called packets, where packets carry information about their recipient and are forwarded in a general mesh network from the sender and then passed from one device to the next until they reach the recipient. Defining the path of a message, i.e. determining which devices the packets will be forwarded through, is referred to as routing. The goal of routing is to ensure the most reliable and the fastest delivery of a packet from sender to recipient.

In a general wireless mesh network, it is usually not known in advance which devices are able to establish a connection with each other. Therefore, routing in a mesh network is a relatively complex technical and algorithmic problem, especially due to the number of possible paths resulting from combinations of different connections, where the number of total possible connections in a network involving n devices is less than or equal to the number Nmax given by the formula $Nmax=n*(n-1)/2$.

U.S. Pat. No. 8,681,656 discloses a method for routing wireless mesh packets that guarantees reliable and efficient message delivery between a control communications device C and a plurality of slave communications devices N. The disclosed routing method uses a virtual routing structure in combination with time division multiple access (TDMA) ensuring routing via a sequential and efficient flooding of the network controlled by a data flow based on virtual routing numbers (VRN) assigned to each device N. TDMA is often used in practice to prevent transmission collisions due to its easy implementation and reliability. TDMA is based on the fact that in a given time interval, called a time slot, only a single specified device may transmit within a frame made up of multiple time slots. Accordingly, each time slot in a frame is dedicated to a single device for transmission during that time slot. The time slot when each device N is active (i.e. when it may perform routing or transmit, and confirm the receipt of message packets) is determined by its uniquely assigned VRN. VRNs can be, for example, integers that form an ordered sequence (e.g. each VRN can be one greater than the last). A time slot can be assigned to each communication device N based on its VRN. The number of possible time slots in each TDMA frame will depend on the size of the virtual routing structure (the number of slave communication devices N in the virtual routing structure). Network discovery and assignment of virtual routing numbers VRN can be implemented by having the control communication device C first send an ANSWERME message. All slave communication devices N that receive the ANSWERME message will in turn reply (replies can be initiated at random times to reduce collisions). For each device N that replies, the control device C assigns it a VRN, which is transmitted to and stored by the slave device N. The control device C then sends a DOSCAN message to each slave communication device N found in its vicinity, one after another. In response to the DOSCAN message, each device N in turn sends an ANSWERME message to similarly find other N devices in its vicinity and returns the results to the control device C. The control device C can then assign and pass the VRNs through the device N that performed the DOSCAN for communication of the assigned VRNs to the assigned devices. The control communication device C can then in a next iteration cycle similarly send the DOSCAN message to all other slave devices N found in the previous cycle. This process will repeat until all communication devices N in the network are found. The number of the iteration cycle can be used to divide communication cycles into zones where the number of the iteration cycle expresses the minimal number of routings or hops to each device included in a zone.

U.S. Pat. No. 9,615,308 discloses a method that leverages the method for routing described above in U.S. Pat. No. 8,681,656, but improves response times when data needs to be collected from multiple slave devices on a network. As the number of communication devices connected to the network increases, so does the size of the TDMA frame. If each slave device N exclusively uses a full TDMA frame to transmit data to the control device C, n frames would be required to collect data from n network devices. This leads to increased response times, overhead, an inefficiency as the number of devices n increases. In the disclosed method, however, data from multiple devices N are collected and aggregated by intermediate devices N. Within a single TDMA network frame, the data are successively collected and aggregated and ultimately passed back through the network to the control device C. The aggregation method substantially improves the time efficiency of data collection in ordered wireless mesh networks having an established routing structure using directional flooding. More specifically, individual addressed slave communication devices N, receive an initiation message frame from the control communication device C. The initiation frame starts a process through which the intermediate slave communication devices collect, aggregate and transmit data back to the control device C in an acknowledgement frame that is time-synchronized to the initiation frame. Each of the intermediate slave communication devices can set a bit or a number of bits of its own data, which it merges with data or bits received from acknowledgement messages received from other addressed slave communication devices during the acknowledgement frame. The acknowledgement messages including aggregated or merged data are successively sent by the slave communication devices in the corresponding time slot of the acknowledgement frame from the highest virtual routing number through the lowest. In this manner the data from all slave devices can be aggregated and collected as transmissions by the slave devices progress back towards the control communication device.

SUMMARY OF THE INVENTION

A wireless mesh network includes a controller in wireless communication with a plurality of slave devices where each slave device is assigned a virtual routing number that defines a time slot in a TDMA communications frame. The slave devices are configured to receive, out of band and/or separately from the TDMA communications frame, asynchronous transmissions of sensor data from battery operated sensor devices. The battery operated sensor devices transmit asynchronously and do not participate in the TDMA communications frame in order to save battery power. The slave devices store data received from the sensor devices until the data is requested by the controller through an initiation message. In response, the slave devices aggregate data received directly from asynchronous communications with data received from other slave devices during an accumulation process that passes the accumulated date back to the controller through the mesh network during a TDMA acknowledgement frame.

A method includes operating a wireless mesh network including a control communication device and a plurality of routing communication devices, wherein the control communication device is in wireless communication through the mesh network with the plurality of routing communication devices, wherein each of the plurality of routing communication devices is assigned a virtual routing number through a network discovery process, and wherein each routing communication device is assigned a dedicated time slot for transmitting during time division multiple access message frames based on the assigned virtual routing number; for each of at least one of the plurality of routing communication devices, the each routing communication device: receiving, through one or more asynchronous wireless transmissions, sensor data from one or more battery operated sensor devices, and storing the received sensor data in a memory; the control communication device wirelessly transmitting an initiation message during an initiation message frame within which the initiation message is received by the plurality of routing communication devices; within a time division multiple access acknowledgement frame, for each of at least one of the plurality of routing communication devices, the each routing communication device: receiving from another of the routing communication devices at least one acknowledgement message containing upstream sensor data originating from one or more battery operated sensor devices and having been received asynchronously by at least one other of the plurality of routing communication devices, merging the sensor data stored in the memory of the each routing communication device with the upstream sensor data, and transmitting the merged sensor data in an acknowledgement message within a time slot assigned exclusively to the each routing communication device during the time division multiple access frame; and the control communication device receiving at least one acknowledgement message, wherein the at least one acknowledgement message contains aggregated sensor data originating from a plurality of battery operated sensor devices, the aggregated sensor data having been asynchronously received by the at least one of the plurality of routing communication devices.

The method can be performed such that the initiation message includes a data selection specification, wherein the data selection specification defines a subset of data received by the plurality of routing communication devices to be provided in response to the initiation message.

The method can be performed such that the data selection specification identifies a subset of the battery operated sensor devices from which data is requested.

The method can be performed such that the data selection specification identifies a subset of the data received by the battery operated sensor devices.

The method can be performed such that the subset of the data received identifies one or more types of sensor data being requested.

The method can be performed such that the initiation message specifies a timing for initiation of the acknowledgement frame.

The method can be performed such that the initiation message specifies an adjustment of a timing for initiation of the acknowledgement frame.

The method can further include: for each of at least one of the plurality of routing communication devices, the each routing communication device further: receiving, through one or more asynchronous wireless transmissions, sensor data from one or more non-battery operated sensor devices, and storing the received sensor data in a memory.

The method can be performed such that the sensor data received by the at least one routing communication devices from the non-battery operated sensor devices is merged with and transmitted to the control communication device along with sensor data originating from one or more battery operated sensor devices.

A system can include the control communication device and the plurality of routing communication devices that perform any of the foregoing methods.

A method can include collecting data from communication devices in a wireless mesh network with packet-based message transmission, the communication devices being arranged for conflict-free routing using time division multiplexing and a virtual routing number, the virtual routing number for each communication device being stored thereon and expressing a distance from a control communication device, wherein the mesh network includes at least one control communication device, a plurality of routing communication devices, and a plurality of sensor devices. More particular the method can include: each routing communication device receiving and storing sensor data asynchronously sent from the sensor devices; each routing communication device, upon receiving an initiation message from the control communication device, selecting and setting one or more bits from the stored sensor data; and at least one of the routing communications devices: merging the one or more bits with acknowledgement collection messages received from another of the routing communication device with a higher virtual routing number during an acknowledgement frame, the acknowledgement frame being time synchronized with an initiation frame, and sending the one or more bits merged with the acknowledgement collection messages within a corresponding time slot of the acknowledgement frame.

The method can further include inserting additional information into the initialization message by the control communication device, wherein the routing communication devices interpret the additional information by at least setting the one or more bits in accordance with the result of the interpretation.

The method can further include time shifting the acknowledgement frame depending on the additional information inserted in the initiation message by the control communication device.

A device that performs the foregoing method can include: a memory, a portion of which memory is dedicated to storing received sensor data; and a control unit interpreting initiation messages and providing data aggregation.

The device can be configured such that the entire memory is fully dedicated to receiving sensor data asynchronously sent by sensor devices.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

FIG. 2 is a table that shows an example data aggregation during an acknowledgement frame in the topological network arrangement shown in FIG. 1.

FIG. 3 illustrates two example physical implementations of a routing slave communication device N.

FIG. 4 illustrates a block diagram of a routing slave communication device N in accordance with one embodiment.

DETAILED DESCRIPTION

Figure 1:
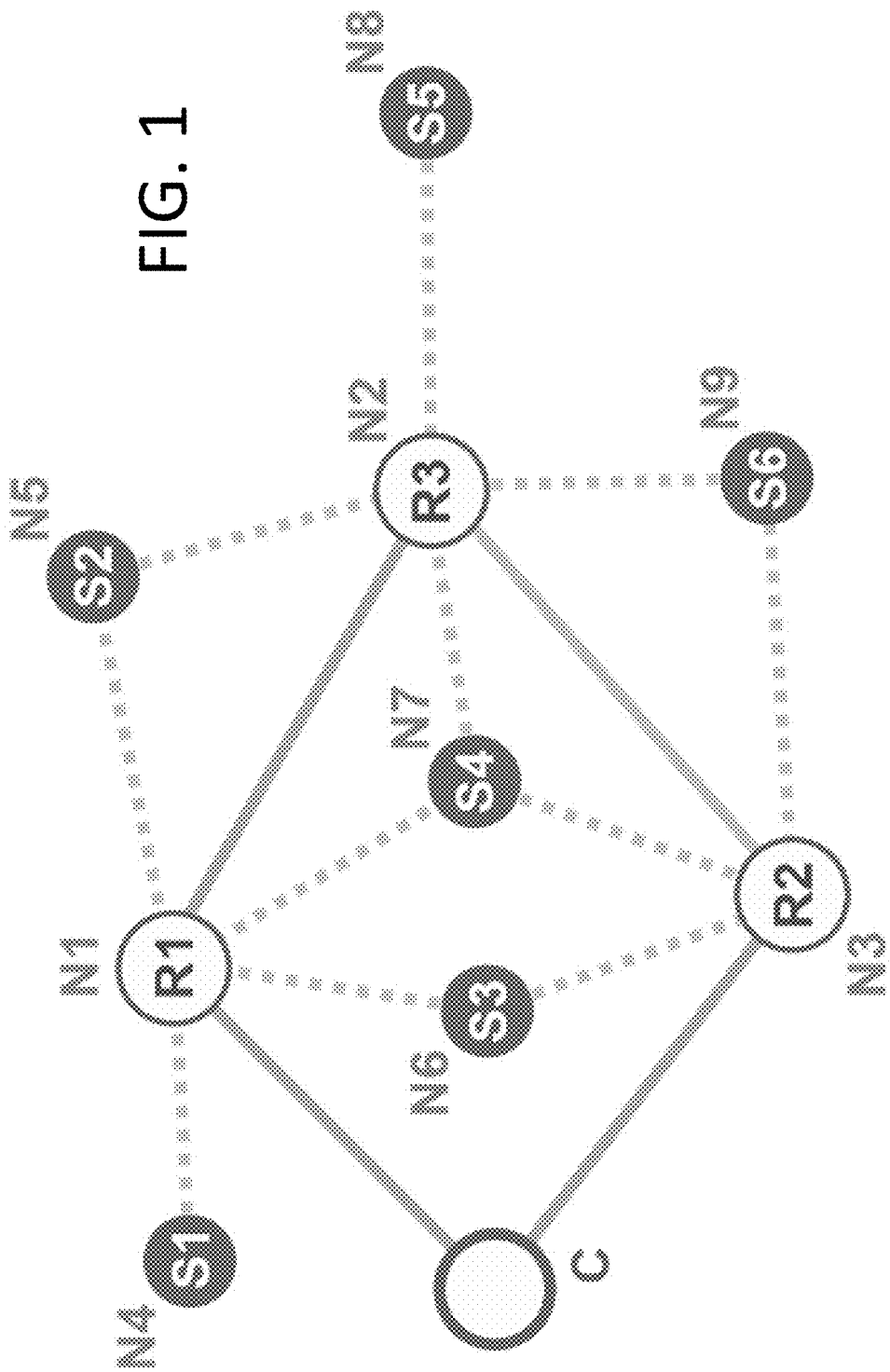
FIG. 1 illustrates an example network topology.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

In certain implementations, mesh network communications devices may be or may include battery-powered sensor devices S, which typically operate in sleep mode and only wake up to communication modes when they need to communicate. In the routing and data collection methods described in the background above, however, communication must be scheduled in advance. A technical limitation affecting the energy efficiency of the sensor device in this case is the need to wake it up precisely just before receiving an initiation message from the control communication device or controller C so that the sensing device can receive the message and execute the appropriate sequences. Earlier wake-up results in an efficiency reduction due to spending more time in the energy-intensive communication mode, which leads to higher power consumption and consequently to limited battery life, while later wake-up results in missing of the initialization message and to routing failure. Precise timing then usually means higher economic costs due to the need to use precise timers with very low power consumption. Moreover, even if accurate timing is achieved on sensor devices S, their energy efficiency may be further reduced, for example, if the control network device C is busy with execution of priority commands from the parent system and therefore sends the initialization packet later than scheduled. Similarly, it fails if the initialization message, for example, due to ambient interference, does not reach the sensor device S. In these cases, the sensor devices S have to wait for a longer time in receive mode, in which the power consumption is few orders of magnitude higher than in sleep mode.

FIG. 1 illustrates an example network topology including a controller C, three slave routing communication devices N1-N3, and six sensor communication devices N4-N9, also labeled S1 to S6. The three slave routing communication devices N are referenced by N1-N3 and have been assigned virtual routing numbers R1-R3 (more precisely 1-3) in accordance with the routing scheme as described in U.S. Pat. No. 8,681,656. The six sensor communication devices S are referenced by N4-N9 to indicate that they are additional devices communicating on the network, but they are also referenced as S1-S6 to differentiate them from the slave routing communication devices N. Solid lines show direct links within this mesh network topological arrangement that link the controller C to the three routing slave communication devices N in bi-directional communication using initiation messages and acknowledgement messages as described in U.S. Pat. No. 9,615,308, referenced above.

Referring again to FIG. 1, the dashed lines for each sensor device S1 to S6 show which routing devices N can receive their transmissions/data in this topological arrangement. The sensing devices can be configured to asynchronously transmit or broadcast sensor data periodically, which is then received by one or more of the routing devices N. The asynchronous transmissions can be configured using a different frequency or protocol so as not to interfere with the bidirectional mesh network communication between the controller and the routing communication devices. Any sensor can be configured to send various data in one broadcasted message since there can be multiple sensors collecting multiple elements of data in one sensor device. The sensor may also send other diagnostic or operating data, such as a state of its battery, during its broadcast.

Each routing slave communication device N receiving asynchronous transmissions from sensors within range can in turn store the received sensor data in a local memory of the device. The data for each sensor can be stored separately in association with a unique identifier of that sensor.

In order to propagate the received sensor data back to the controller C, each routing slave communication device N awaits an initiation message transmitted directly by the controller C, or indirectly from the controller and through one or more other routing slave communication devices N. The initiation message is transmitted through the network during an initiation message frame that defines the timing of transmissions by the controller and each of the slave communication devices N. The initiation message from the controller can be configured to specify what information is being requested (e.g. what type of sensor data and/or which sensors from which it is being requested).

The initialization message, for example, can include a list of sensors and/or routing devices, such as in the form of a bit field, whose data are to be selected, or a definition of the requested type of data can be inserted, for example temperature data or bit information about exceeding the limit value of some physical quantity. Depending on the data requested in the initiation message, only certain data may be selected by the slave communication devices and subsequently aggregated for return to the controller. This can be advantageous, for example, in the case of optimization of heterogeneous telemetry networks with different types of sensor devices, where data from sensors designed for monitoring slow events do not need to be available, and therefore not collected, as often as critical data.

The initiation message frame initiated by the controller establishes a timing with respect to which the various routing devices then transmit responses in an acknowledgement frame that is time synchronized with respect to the initiation message frame. Each routing communication device, in response to receiving the initiation message, selects the requested data to be collected, which may be one or more bits, from the received sensing data stored in its memory. The routing slave communication device then inserts the selected data or bits into an acknowledgement message, possibly aggregating the data with other data received from other sensors and/or slave communication devices in an acknowledgement message that is transmitted back through the network to the controller C in an acknowledgement frame. In one embodiment, data transmissions during the acknowledgement message frame are performed sequentially, starting with routing devices with higher virtual routing numbers and proceeding to routing devices with lower virtual routing numbers until the data is finally returned to the controller. Each subsequent routing device can aggregate, merge, or add any additional data (received and stored from local sensors or received from other routing devices) into the acknowledgement message as the message progresses back to the controller.

As illustrated in FIG. 1, multiple routing slave devices N may receive asynchronous communications from any single sensor. For example, the transmissions of sensor S4 are shown as being received by all of slave communication devices N1-N3. Once a first routing device inserts or aggregates data from a specific sensor into an acknowledgement message, other subsequent routing devices that may have also received the same data from the same sensor no longer need to insert it into the acknowledgement message.

During an acknowledgement frame, each routing device can incorporate the sensor data stored in its memory and requested by the controller C into an acknowledgement message that accumulates data from various sensor and routing devices for return to the controller in a similar manner to the methods disclosed in U.S. Pat. No. 9,615,308, referenced above. Since data is collected asynchronously from sensors by a smaller number of routing devices, the sensors themselves need not be given time slots or assigned virtual routing numbers in the communication frames. This, in turn can result in a massive reduction in the duration of the communication frame compared to U.S. Pat. No. 9,615,308.

The initiation message can also include additional information, such as, for example, a requirement for a delay before the start of the acknowledgement frame. Such a delay may be advantageous in networks with routing devices of different computational power in order to time synchronization of acknowledgement transmissions by individual routing devices. For example, when more computationally intensive selection and aggregation operations must be performed, a routing communication device may be delayed and would otherwise miss its respective time slot during the acknowledgement frame due to longer execution time of aggregation operations. By inserting additional information into the initialization message and then interpreting it at the routing devices, the system can be further optimized for a specific application and bring additional benefits such as increasing the data collection rate, reducing the load on the transmission channel, or ensuring higher reliability of the entire data collection method.

FIG. 2 is a table that shows an example data aggregation during an acknowledgement frame in the topological network arrangement shown in FIG. 1. The second line of the table shows, for each of the routing devices N1-N2 and the controller C what data has been received and stored in the device's memory. For the device N1, it has received sensor data from sensors S1-S4; for N2, it has received sensor data from S2 and S4-S6; for N3, it has received sensor data from S3, S4 and S6 (all as shown by the dashed lines in FIG. 1).

Referring again to FIG. 2, the fifth through seventh lines of the table show, for each of three time slots 0-2 in the acknowledgement message frame, the sensor data transmitted by the active/transmitting device during the time slot as well as the data aggregated or received by each of the devices N1-N3 and the controller at the end of the time slot. For time slot 0, the device N2 transmits sensor data for S2 and S4-S6, which is received by N1 and N3. At the end of slot 0, device N1 has now received sensor data for S5 and S6 (as well as S2) from device N2, and in combination with the stored values from S1-S4, N1 has data from all of S1-S6. Device N2 has completed its transmission, which is indicated by the word "end" in the table. Device N3 has now received sensor data for S2 and S5 from device N2, and in combination with its stored values, N3 has data from S2-S6. The controller has not received any data yet. For time slot 1, the device N3 transmits sensor data for S2-S6, which is received by the controller. At the end of slot 1, device N1 still has data from all of S1-S6, as it did not transmit or receive during slot 1. The controller, having received a transmission from N3, now has data from S2-S6. Device N3 has also now completed its transmission as indicated. For time slot 2, the device N1 transmits sensor data for S1-S6, which is also received by the controller. With the value for S1 now having been received from N1, the controller now also has data for S1-S6, device N1 has also completed it transmission, and the end of the acknowledgement frame has been reached.

FIG. 3 illustrates two example physical implementations of a routing slave communication device N. FIG. 4 illustrates a block diagram of a routing slave communication device N in accordance with one embodiment. While the disclosure above describes the sensor devices as battery operated, the methods and devices described herein can also be used for non-battery operated sensor devices that receive power from a constant source.

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method comprising:
   operating a wireless mesh network including a control communication device and a plurality of routing communication devices, wherein the control communication device is in wireless communication through the mesh network with the plurality of routing communication devices, wherein each of the plurality of routing communication devices is assigned a virtual routing number through a network discovery process, and wherein each routing communication device is assigned a dedicated time slot for transmitting during time division multiple access message frames based on the assigned virtual routing number;

for each routing communication device of at least one of the plurality of routing communication devices, the each routing communication device:
  receiving, through one or more asynchronous wireless transmissions, sensor data from one or more battery operated sensor devices, and
  storing the received sensor data in a memory;

the control communication device wirelessly transmitting an initiation message during an initiation message frame within which the initiation message is received by the plurality of routing communication devices;

within a time division multiple access acknowledgement frame, for each routing communication device of the at least one of the plurality of routing communication devices, the each routing communication device:
  receiving from another of the routing communication devices at least one acknowledgement message containing upstream sensor data originating from one or more battery operated sensor devices and having been received asynchronously by at least one other of the plurality of routing communication devices,
  merging the sensor data stored in the memory of the each routing communication device with the upstream sensor data, and
  transmitting the merged sensor data in an acknowledgement message within a time slot assigned exclusively to the each routing communication device during the time division multiple access frame; and the control communication device receiving at least one acknowledgement message, wherein the at least one acknowledgement message contains aggregated sensor data originating from a plurality of battery operated sensor devices, the aggregated sensor data having been asynchronously received by the at least one of the plurality of routing communication devices.

2. The method of claim 1, wherein the initiation message includes a data selection specification, wherein the data selection specification defines a subset of data received by the plurality of routing communication devices to be provided in response to the initiation message.

3. The method of claim 2, wherein the data selection specification identifies a subset of battery operated sensor devices from which data is requested.

4. The method of claim 2, wherein the data selection specification identifies a subset of data received from the plurality of battery operated sensor devices.

5. The method of claim 4, wherein the subset data received identifies one or more types of sensor data being requested.

6. The method of claim 1, wherein the initiation message specifies a timing for initiation of the acknowledgement frame.

7. The method of claim 1, wherein the initiation message specifies an adjustment of a timing for initiation of the acknowledgement frame.

8. The method of claim 1, further comprising:
for each routing communication device of the at least one of the plurality of routing communication devices, the each routing communication device further:
  receiving, through one or more asynchronous wireless transmissions, sensor data from one or more non-battery operated sensor devices, and
  storing the received sensor data in a memory.

9. The method of claim 8, wherein the sensor data received by the at least one of the plurality of routing communication devices from the non-battery operated sensor devices is merged with and transmitted to the control communication device along with sensor data originating from one or more battery operated sensor devices.

10. A system comprising the control communication device and the plurality of routing communication devices, wherein the control communication device and the plurality of routing communication devices perform the method of claim 1.

11. A method of collecting data from communication devices in a wireless mesh network with packet-based message transmission, the communication devices being arranged for conflict-free routing using time division multiplexing and a virtual routing number, the virtual routing number for each communication device being stored thereon and expressing a distance from a control communication device, wherein the mesh network includes at least one control communication device, a plurality of routing communication devices, and a plurality of sensor devices, the method comprising:
  each of the plurality of routing communication devices receiving and storing sensor data asynchronously sent from the sensor devices;
  each of the plurality of routing communication devices, upon receiving an initiation message from the control communication device, selecting and setting one or more bits from the stored sensor data; and
  at least one of the plurality of routing communications devices:
    merging the one or more bits with acknowledgement collection messages received from another of the plurality of routing communication devices with a higher virtual routing number during an acknowledgement frame, the acknowledgement frame being time synchronized with an initiation frame, and
    sending the one or more bits merged with the acknowledgement collection messages within a corresponding time slot of the acknowledgement frame.

12. The method of claim 11, further comprising inserting additional information into the initiation message by the control communication device, wherein each of the plurality of routing communication devices interprets the additional information by at least setting the one or more bits in accordance with the result of the interpretation.

13. The method of claim 12, further comprising time shifting the acknowledgement frame depending on the additional information inserted in the initiation message by the control communication device.

14. A device that performs the method of claim 11, wherein the device comprises:
  a memory, a portion of which memory is dedicated to storing received sensor data; and
  a control unit interpreting initiation messages and providing data aggregation.

15. The device of claim 14, wherein the entire memory is fully dedicated to receiving sensor data asynchronously sent by sensor devices.

* * * * *